United States Patent
Khanlarov

(10) Patent No.: US 8,833,778 B2
(45) Date of Patent: Sep. 16, 2014

(54) STABILIZER ARRANGEMENT FOR A CHASSIS OF A MOTOR VEHICLE

(71) Applicant: Dr. Ing. h.c. F. Porsche Aktiengesellschaft, Stuttgart (DE)

(72) Inventor: Jafar Khanlarov, Weissach-Flacht (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/957,535

(22) Filed: Aug. 2, 2013

(65) Prior Publication Data

US 2014/0049016 A1 Feb. 20, 2014

(30) Foreign Application Priority Data

Aug. 16, 2012 (DE) .......................... 10 2012 107 507

(51) Int. Cl.
B60G 21/05 (2006.01)

(52) U.S. Cl.
USPC ....... 280/124.106; 280/124.149; 280/124.152

(58) Field of Classification Search
USPC ...................... 280/124.106, 124.149, 124.152
See application file for complete search history.

(56) References Cited

U.S. PATENT DOCUMENTS

| | | | |
|---|---|---|---|
| 5,580,079 A | 12/1996 | Pradel et al. | |
| 5,826,687 A * | 10/1998 | Bungeler et al. | 188/296 |
| 6,929,271 B2 * | 8/2005 | Trotter et al. | 280/124.106 |
| 7,237,785 B2 * | 7/2007 | Kraus et al. | 280/124.106 |
| 7,311,316 B2 * | 12/2007 | Yasui et al. | 280/5.511 |
| 7,540,505 B2 * | 6/2009 | Ogawa | 280/5.502 |
| 7,588,259 B2 * | 9/2009 | Azekatsu et al. | 280/124.107 |
| 7,837,202 B2 * | 11/2010 | Taneda et al. | 280/5.511 |
| 8,109,522 B2 * | 2/2012 | Pinkos et al. | 280/5.511 |
| 8,167,319 B2 * | 5/2012 | Ogawa | 280/5.511 |
| 2005/0023789 A1 * | 2/2005 | Suzuki et al. | 280/124.106 |
| 2005/0179221 A1 * | 8/2005 | Yasui et al. | 280/5.506 |
| 2006/0049601 A1 * | 3/2006 | Matsumoto | 280/124.106 |

FOREIGN PATENT DOCUMENTS

| | | |
|---|---|---|
| DE | 4204252 A1 | 8/1993 |
| DE | 4435491 A1 | 5/1995 |
| DE | 4443809 A1 | 4/1996 |
| DE | 10120219 A1 | 10/2002 |
| DE | 102009045619 A1 | 4/2011 |

OTHER PUBLICATIONS

Search Report from German priority application DE 10 2012 107 507.7, dated Mar. 14, 2013, with partial English translation.

* cited by examiner

*Primary Examiner* — Toan To
(74) *Attorney, Agent, or Firm* — RatnerPrestia

(57) ABSTRACT

A stabilizer arrangement for a chassis of a motor vehicle, including at least one element, which entirely or partially compensates for vehicle movements, in the region of a wheel suspension connected to the stabilizer arrangement, wherein the element is activatable via flexible lines wherein the flexible lines can be guided by a central control unit via openings arranged in the stabilizer bearing substantially below the stabilizer, as seen in the vertical direction of the vehicle, to the element interacting with a stabilizer.

6 Claims, 2 Drawing Sheets

STABILIZER ARRANGEMENT FOR A CHASSIS OF A MOTOR VEHICLE

CROSS-REFERENCE TO RELATED APPLICATIONS

This application claims priority to German Patent Application No. 10 2012 107 507.7, filed Aug. 16, 2012, which is incorporated by reference herein in its entirety.

FIELD OF THE INVENTION

The invention relates to a stabilizer arrangement for a chassis of a motor vehicle, comprising at least one element, which entirely or partially compensates for vehicle movements, in the region of a wheel suspension connected to the stabilizer arrangement, wherein the element is activatable via flexible lines.

BACKGROUND OF THE INVENTION

The laying of flexible lines to the supply of hydraulics or electrics/electronics in a motor vehicle is problematic, in particular in the region of the vehicle axles or wheel suspension—but not only there—since, during operation, vehicle parts, in particular wheels and wheel suspensions, execute not inconsiderable relative movements with respect to the vehicle parts surrounding them. However, for the reliable operation of a vehicle it is absolutely necessary to securely protect the laid lines not only against damage due to objects acting on the vehicle from the outside, for example stone striking thereagainst, but also in particular against damage due to, for example, such relative movements (tension or compression applied to the lines or rotation of the lines) or due to chafing movements against other parts of the vehicle. The guiding of the lines in the case of motor vehicles which are equipped with systems with which movements of the vehicle about the longitudinal, transverse and/or verticle axes are intended to be entirely or partially compensated for is very particularly problematic. In order to be able to achieve said compensation, elements, for example actuators, are arranged in the region of the chassis and are activated hydraulically and/or electrically by a control unit, arranged, for example, centrally in the vehicle, via flexible supply lines laid in the region of the chassis. Such lines are very particularly exposed to the above-mentioned relative movements; however, they are also at risk because they have to be arranged relatively close to the ground and in the immediate vicinity of the rotating wheels.

DE 44 43 809 A1 and DE 101 20 219 A1, which are incorporated by reference herein, disclose stabilizer arrangements and vehicle axle arrangements, from which approaches leading to a solution of the discussed problem can be gathered.

However, the inventor was not only faced with solving the problem of laying the flexible lines with protection against damage; for weight and cost reasons, the guiding of the lines is intended to be able to be implemented as directly as possible—in other words: over short routes.

SUMMARY OF THE INVENTION

The invention relates to guiding lines in a stabilizer arrangement for a chassis of a motor vehicle, which is intended to ensure a high degree of protection against damage due to relative movements of the vehicle and due to external influences and, in addition, to make possible as short and direct laying routes as possible in the vehicle.

The flexible lines are guided via openings arranged in the stabilizer bearing substantially below the stabilizer, as seen in the vertical direction of the vehicle, to the element interacting with a stabilizer. Depending on the position of the generally central—but optionally also a plurality of decentral—control units in the vehicle, said guiding of the lines directly via the stabilizer bearing without substantial deflections is a particularly advantageous solution. By means of the guiding of the lines via at least two openings in the stabilizer bearing, the lines can be laid in this region without special protection. Additional protection is merely required wherever the lines emerge out of the protected region in the stabilizer bearing and are guided to the element interacting with the stabilizer, for example to an actuator for compensating for shaking movements. However, these routes can be kept relatively short.

The invention relates not only to hydraulic lines; it is also usable for the electrical/electronic supply and electromechanical supply.

A particularly expedient solution, according to aspects of the invention, can be seen in the fact that the openings in the stabilizer bearing for receiving the lines are open to one side, the lines are insertable therein from the outside and, for example, but not necessarily, are held under a non-positive connection, and protection against damage is ensured via parts of the subframe, which supports the stabilizer bearing, which parts downwardly cover the stabilizer bearing. It is furthermore conceivable to arrange the openings at the top and/or the bottom, next to one another in the horizontal direction, or on the left and/or on the right, above one another in the vertical direction. If there are more than two openings, the openings can advantageously be arranged opposite one another, wherein each half of a stabilizer bearing can be assigned two openings.

Since the stabilizer bearing is composed in a manner known per se of a rubber-elastic material, the additional protection, for example by means of a sheet-metal layer on the subframe, is a highly effective solution. Furthermore, advantages relating to the acoustic decoupling of the components arise through the solution, according to aspects of the invention.

A particular advantage of the invention can be seen in the fact that, in addition to the secure, protected accommodation of the flexible lines, short line routes are achieved and therefore costs and weight are saved.

In addition, however, by laying the lines directly through the stabilizer bearing, no additional bores are required for the guiding of the lines, for example in the subframe supporting the stabilizer bearing or in other components in the vicinity of the wheels; this results in a desired increase in the rigidity in this region.

BRIEF DESCRIPTION OF THE DRAWING

The drawing is a schematic illustration of an exemplary embodiment of the subject matter of the invention. The features of the invention will be explained in more detail with reference to this exemplary embodiment.

In the drawing.

DETAILED DESCRIPTION OF THE DRAWING

Figure 1:
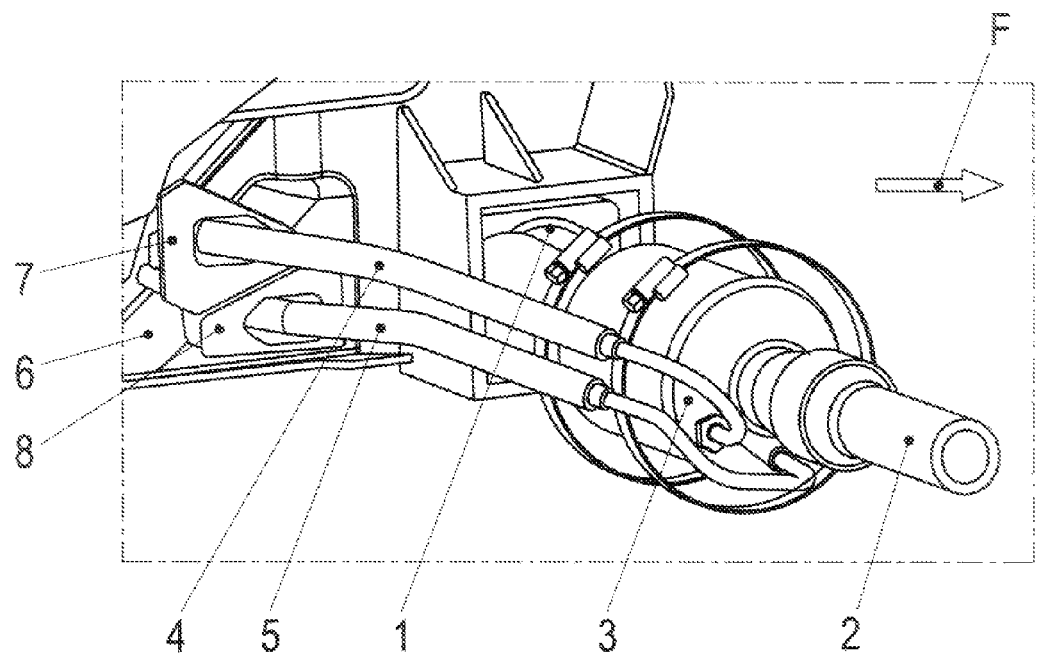
FIG. 1 shows a stabilizer arrangement with supply lines, which are guided around the stabilizer bearing, to the actuator interacting with the stabilizer.

In FIG. 1, the bearing of a stabilizer 2 is denoted by 1. An element/actuator 3 interacts with 5 the stabilizer 2 and is arranged on the stabilizer 2 or at the stabilizer 2. The actuator 3 is supplied and/or activated via hydraulic and/or electric supply lines 4 and 5. Said supply lines 4, 5 are protectively sheathed, for example by flexible steel tubes. They are generally arranged behind the stabilizer bearing 1, as seen in the direction of travel (travel direction F), and are guided around said stabilizer bearing. In order to guide the supply lines 4, 5, the subframe 6 supporting the stabilizer bearing 1 is provided with bores, into which the supply lines 4, 5 are inserted via protective rubber bushings 7, 8.

It can already be seen from this schematic illustration that the laying of the supply lines and of the additional protection thereof via stable sheathing has to overcome distances which are relatively long—and are therefore associated with high costs.

Figure 2:
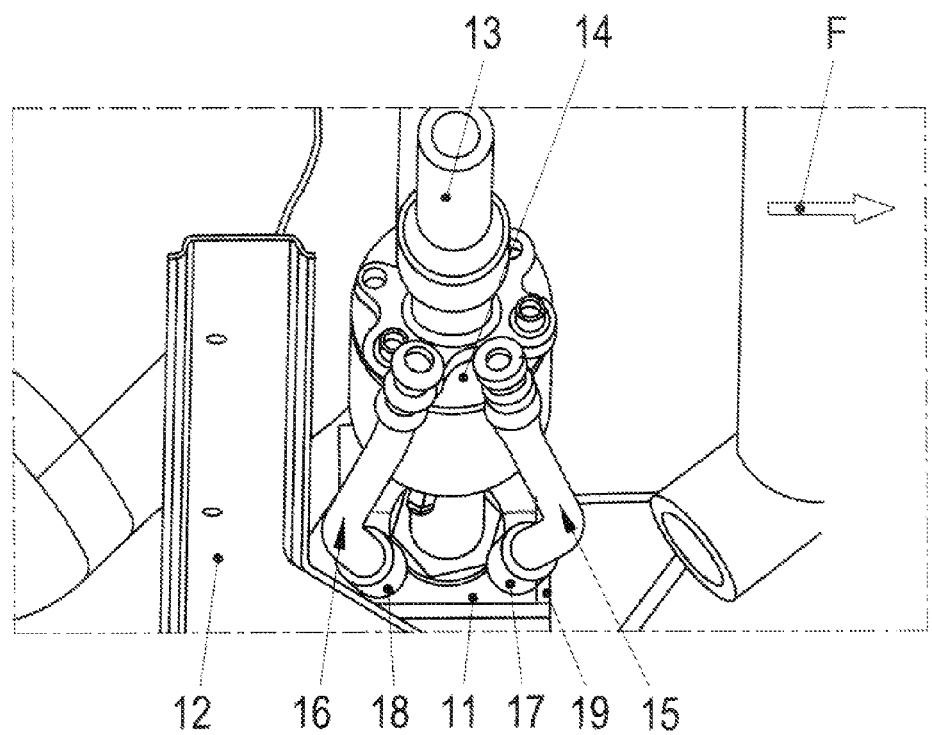
FIG. 2 shows a laying of the supply lines according to aspects of the invention.

An exemplary embodiment of the invention is illustrated in FIG. 2. A stabilizer bearing 11 is mounted in a U-shaped subframe 12. A stabilizer 13 is mounted in the stabilizer bearing 11, which is produced from rubber-elastic material, and an element/actuator 14 for compensating for shaking, pitching and similar relative movements of the vehicle body with respect to the chassis is mounted on said stabilizer. The actuator 14 is supplied via supply lines 15, 16. Said supply lines 15, 16 are guided via openings 17 and 18 arranged in the stabilizer bearing and via said openings through the stabilizer bearing in a protected manner to a control unit (not illustrated). The stabilizer bearing 11 is surrounded in a protected manner by a part 19 of the subframe 12.

Simply from a comparison in FIGS. 1 and 2 of the drawing, it can be seen that the laying of the lines, according to aspects of the invention, has to span comparatively short distances; the safety is therefore increased, and, in addition, a cost-effective and acoustically advantageous solution is achieved.

Figure 3:
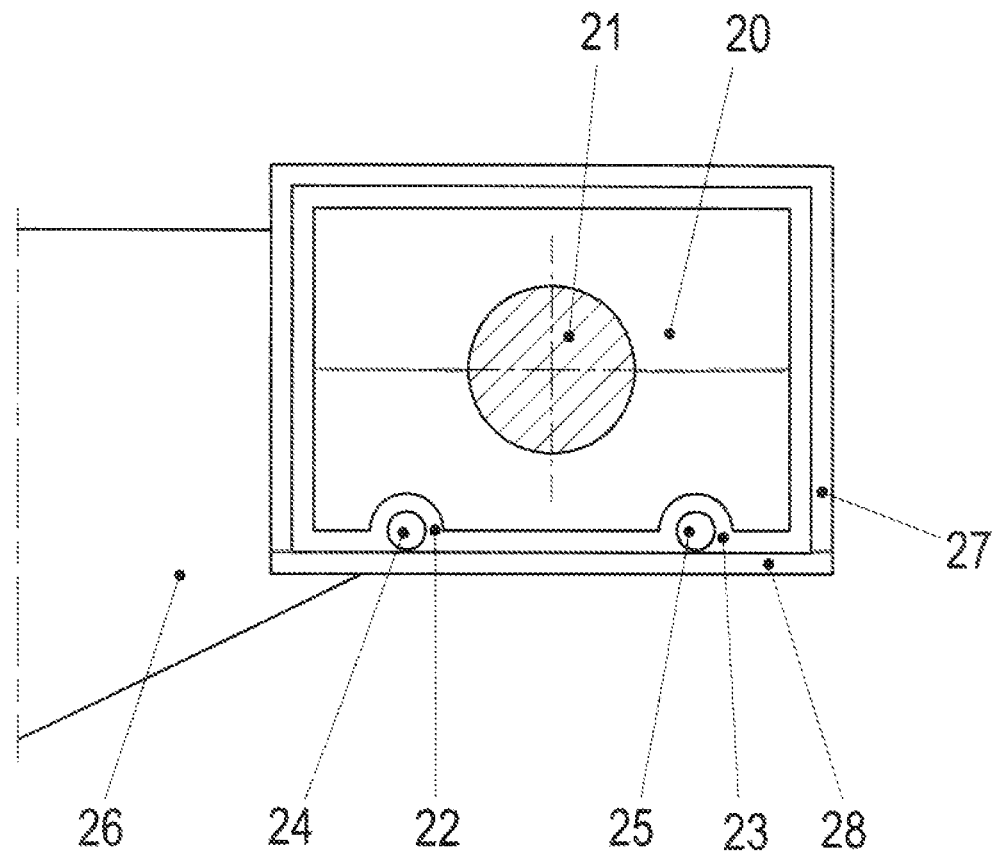
FIG. 3 shows a further exemplary embodiment of the invention.

A particularly advantageous solution is illustrated, merely schematically, in FIG. 3 as a modified exemplary embodiment of the solution according to FIG. 2. The two-part stabilizer bearing 20 with the stabilizer 21 here has downwardly open openings 22 and 23—as seen in the vertical direction of the vehicle—into which the supply lines 24 and 25 can be inserted in a non-positive manner, for example by clipping. The stabilizer bearing 20, as part of the subframe 26, is surrounded by a U-shaped stabilizer frame 27, wherein a lower frame part 28 constitutes the secure holding and protection for the supply lines 24 and 25. Otherwise, the solution according to FIG. 3 corresponds to the solution described above with reference to FIG. 2.

What is claimed:

1. A stabilizer arrangement for a chassis of a motor vehicle, comprising: at least one element, which entirely or partially compensates for vehicle movements, located in a region of a wheel suspension connected to the stabilizer arrangement for interacting with a stabilizer of the motor vehicle, wherein the element is activatable via flexible lines connected between the element and a central control unit, and wherein the flexible lines are positioned through openings arranged in a bearing of the stabilizer.

2. The stabilizer arrangement as claimed in claim 1, wherein the openings are arranged next to one another substantially below and/or above the stabilizer, as seen in a vertical direction of the vehicle.

3. The stabilizer arrangement as claimed in claim 1, wherein the openings are arranged above one another substantially on the left-hand side and/or on the right-hand side of the stabilizer, as seen in a vertical direction of the vehicle.

4. The stabilizer arrangement as claimed in claim 1, wherein the flexible lines are hydraulic pressure tubes and the at least one element is a hydraulic actuator.

5. The stabilizer arrangement as claimed in claim 1, wherein the flexible lines are electric lines and the at least one element is an electric actuator.

6. The stabilizer arrangement as claimed in claim 1, wherein the openings for receiving the lines are open at least to one side, and the flexible lines are positionable therein in a non-positive manner and are securable by parts of a subframe supporting the stabilizer bearing.

* * * * *